(12) United States Patent
Lavi et al.

(10) Patent No.: US 8,792,418 B2
(45) Date of Patent: Jul. 29, 2014

(54) METHOD FOR HANDLING CORRUPTED SIGNALS IN A WIRELESS NETWORK

(75) Inventors: Nadav Lavi, Ramat Hasharon (IL); Jacob Vainappel, Herzeliya (IL)

(73) Assignee: Sparkmotion Inc., Ottawa, Ontario (CA)

( * ) Notice: Subject to any disclaimer, the term of this patent is extended or adjusted under 35 U.S.C. 154(b) by 431 days.

(21) Appl. No.: 12/730,466

(22) Filed: Mar. 24, 2010

(65) Prior Publication Data

US 2010/0246490 A1 Sep. 30, 2010

(30) Foreign Application Priority Data

Mar. 24, 2009 (IL) .......................................... 197881

(51) Int. Cl.
*H04L 12/26* (2006.01)
(52) U.S. Cl.
USPC ......................................................... 370/328
(58) Field of Classification Search
USPC .................................................. 370/328–338
See application file for complete search history.

(56) References Cited

U.S. PATENT DOCUMENTS

| | | | |
|---|---|---|---|
| 6,378,099 B1 | 4/2002 | Rowtich | |
| 6,983,031 B2 * | 1/2006 | Wheatley | 375/368 |
| 8,464,138 B2 * | 6/2013 | Abraham et al. | 714/776 |
| 2004/0192308 A1 * | 9/2004 | Lee et al. | 455/436 |
| 2007/0070902 A1 * | 3/2007 | Elaoud et al. | 370/231 |
| 2007/0091822 A1 | 4/2007 | Do et al. | |
| 2007/0153785 A1 | 7/2007 | Zeng et al. | |
| 2007/0274264 A1 | 11/2007 | Jiang | |
| 2008/0101403 A1 | 5/2008 | Michel et al. | |
| 2009/0046650 A1 * | 2/2009 | Dalsgaard et al. | 370/329 |
| 2009/0154399 A1 * | 6/2009 | Yang et al. | 370/328 |
| 2009/0219873 A1 * | 9/2009 | Higuchi et al. | 370/329 |
| 2010/0195617 A1 * | 8/2010 | Park et al. | 370/331 |
| 2011/0176446 A1 * | 7/2011 | Bourlas et al. | 370/252 |

OTHER PUBLICATIONS

David Chase, Code Combining, May 1985, IEEE, vol. Com-33, No. 5.*
Extended European Search Report for related EP Patent Application No. 10157288.1 dated Jan. 8, 2014 in 6 pages.

* cited by examiner

*Primary Examiner* — Hassan Phillips
*Assistant Examiner* — Omeed D Rahgozar
(74) *Attorney, Agent, or Firm* — Procopio, Cory, Hargreaves & Savitch LLP

(57) ABSTRACT

A method is provided for combining corrupted messages received in a wireless network which comprises the following steps: (a) receiving a first message transmitted from one of a plurality of communication devices, wherein that first message is received as a corrupted message; (b) following the receipt of the first corrupted message, receiving a first plurality of messages, wherein the first plurality of messages are received as corrupted messages and wherein at least one of the first plurality of corrupted messages is essentially identical to the first message; (c) combining the first corrupted message with the at least one of the first plurality of corrupted messages that is essentially identical to that first message to form a combined message; and (d) deriving from the combined message information which was transmitted within the first message.

18 Claims, 4 Drawing Sheets

METHOD FOR HANDLING CORRUPTED SIGNALS IN A WIRELESS NETWORK

FIELD OF THE INVENTION

The present invention relates to wireless communication and more specifically, to methods for improving exchange of communications between communication devices communicating with their respective serving communication stations.

BACKGROUND OF THE INVENTION

A NetWork Entry (NWE) procedure is a procedure that takes place whenever a mobile station (MS) starts to communicate with a base station (BS), whether it is due to a new connection (NWE), re-connecting, and every HandOver (HO) during which the MS switches from being served by one BS to being served by another.

The NWE procedure involves determining how the MS and the respective BS would recognize each other, and how to enable the MS to obtain downlink synchronization with the BS. FIG. 1 demonstrates a typical NWE procedure known in the art which is held between MS 100 and BS 150, operating in accordance with the WiMAX Recommendation. During the first phase of the process the MS receives parameters to be used in transmitting and receiving uplink and downlink communications. Uplink synchronization is obtained by the MS performing a ranging process with BS 150, and adjusting its transmission power. During the procedure, MS 100 transmits a Ranging Request (RNG-REQ) message to BS 150 (step 113), and BS 150 transmits a Ranging Response (RNG-RSP) message to MS 100 (step 115) in response to the RNG-REQ message received thereat.

Upon performing the ranging operation as described above, MS 100 transmits a Subscriber Station Basic Capability Request (SBC-REQ) message (step 117) to BS 150 in order to receive the basic capabilities available for the communications between the BS and the MS. The SBC-REQ message, which is a Medium Access Control (MAC) type of message that MS 100 transmits to BS 150 includes among others, information on a Modulation and Coding Scheme (MCS) level supportable by the MS. Upon receipt of the SBC-REQ message from the MS, BS 150 detects an MCS level supportable by the MS included in the received SBC-REQ message, and transmits a Subscriber Station Basic Capability Response (SBC-RSP) message to MS 100 (step 119) in reply to the SBC-REQ message. The procedure then continues by authenticating and registering the MS and thereafter the MS is serviced by the BS 150.

One of the problems associated with wireless networks is recovery in a case where communications are received as corrupted packets which cannot be properly interpreted and consequently, it is not possible to use the data sent by the other side. Repetitive transmissions of the same data are often of little help because the conditions which caused the corruption of the first attempt are likely to corrupt the repeated attempts as well. HARQ (Hybrid Automatic Repeat ReQuest) is a technique that was set up to enable faster recovery from errors in wireless networks, and it involves storing corrupted packets (referred to by the IEEE 802.16e Recommendation as sub-bursts) that have been received from an identified given MS in the receiving BS rather than discarding them. This provides the capability that even if retransmitted packets are received at the BS with errors, still, a good packet can be derived by combining two or more bad ones. HARQ procedure may be utilized on both data connections and management connections (Basic and Primary connections) and enables to gain from the combining of the sub-bursts additional $10 \log_{10}(N_{sub-bursts})$ dB for each retransmission. However, one of the problems associated with this procedure is that it cannot be carried out for messages exchanged during certain steps of the handshake process between the MS and the BS. FIG. 2 illustrates for which of the steps HARQ may not be implemented, and for which of the steps HARQ may be utilized in the way explained above. Also, there are some further network protocols which have not been initially designed for re-transmission of messages.

FIG. 3 illustrates such an HARQ operation in the uplink (UL) direction. In this case BS 350 instructs MS 300 to re-transmit the sub-burst until the combining of packets is successful. MS 300 transmits in step 311 a message to BS 350 which is received in a corrupted shape (due to any one or more of various reasons such as fading, weak signal, increased interference and the like), a message that is transmitted during one of the stages illustrated in FIG. 2, where HARQ may be implemented. Therefore, in step 313 BS 350 transmits a ReTX-REQ (re-transmission request) to MS 300 informing the latter that its previous message has not been successfully received. Once the MS receives the ReTX-REQ, it transmits in step 315 a ReTX-RSP (re-transmitting response), one which is basically the same message transmitted in step 311. Let us assume that the re-transmitted messages is also received in a corrupted shape, then, since BS 350 has the required knowledge on the identity of the transmitting MS 300 it is capable of combining these two corrupted messages. If the BS succeeds in combining the two messages transmitted in steps 311 and 315 it uses the combined message, but in case where the BS 350 cannot combine the two message into a complete meaningful message, it would transmit again a ReTX-REQ until either the original message is restored or until the number of allowed retransmissions is exhausted (and then the sub-burst is dropped).

Unfortunately, there are several scenarios in the art in which the HARQ is not applicable:

During network entry (NWE) procedure as described in FIG. 1 as prior to the completion of this NWE procedure, the BS is unable to identify the given MS and consequently the BS is unable to combine two or more messages of unknown origin. An underlying assumption for the HARQ process to be effective is that the packets being combined are received from the same source (MS), and if the MS is unidentifiable, the HARQ procedure cannot be activated.

When the HARQ capabilities of the subscriber are unknown to the BS.

During network re-entry (HO and link-loss) ranging transactions, due to the fact that ranging procedure is carried out anonymously.

When the subscriber does not support HARQ operation over management connections. In this case HARQ will not be activated at all on control transactions messages.

Several references are known in the art for utilizing HARQ to improve the transmission QoS. US 2008310338 for example, discloses a method for configuring an acknowledgement mode of an HARQ re-transmission protocol which is used for acknowledging the delivery of data packets of a service provided from a transmitting entity to a receiving entity in a wireless communication.

Another example is US 2006104242 which discloses a method for transmitting and receiving downlink control information in a mobile communication system. In order to transmit data packet in an HARQ mobile communication system, a second transceiver receives an RG as rate control information from a first transceiver. The second transceiver then sets the allowed maximum data rate of an HARQ process and transmits packet data within the allowed maximum data rate to the first transceiver.

However none of these solutions are effective in overcoming the above problems when the HARQ process as explained above cannot be implemented. Thus, the present invention seeks to provide a solution to these unsolved problems.

LEGEND

AK—Authentication Key
BS—Base Station
BWR—BandWidth Request
CDMA—Code Division Multiple Access
CID—Connection IDentifier
CRC—Cyclic Redundancy Check
DL—DownLink
DSA—Dynamic Service Addition
HARQ—Hybrid Automatic Repeat ReQuest
HO—Hand Over
FEC—Forward Error Correction
LLR—Log Likelihood Ratio
MAC—Media Access Control
MCS—Modulation and Coding Scheme
MS—Mobile Subscriber
NWE—NetWork Entry
PKM—Privacy Key Management
REG—REGistration
ReTX—Retransmitting
RNG—RaNGing
RSP—Response
REQ—Request
SBC—Subscriber station Basic Capabilities
SNR—Signal to Noise ratio
TEK—Traffic Encryption Key
TLV—Type/Length/Value
UCD—Uplink Channel Descriptor
UL—Uplink

SUMMARY OF THE INVENTION

It is an object of the present invention to provide a method for improving the network entry process by combining messages transmitted during NWE procedure, when the identity of the MS is unknown to the respective BS.

It is another object of the present invention to provide a method for combining messages during network re-entry (HO and link-loss).

It is another object of the present invention to provide a method wherein a BS combining sub-burst messages of the basic and primary connections, independently whether the MS supporting HARQ operation over management connections.

It is another object of the present invention to provide a method for the BS of combining messages received from the MS without declaring HARQ capabilities and without informing the MS that such a method is being carried out.

It is yet another object of the present invention to provide a method to combine corrupted messages received from an un-identified source and for improving its efficiency by adopting a resemblance test to assist in matching between messages received in a corrupted shape.

It is still another object of the present invention to provide a subscriber terminal that is capable of combining two or more corrupted messages received from its BS.

Other objects of the present invention will become apparent as the description of the invention proceeds.

According to a first embodiment of the present invention, there is provided a method for combining corrupted messages received in a wireless network that comprises at least one communication station and a plurality of communication devices operative to communicate with said communication station, and wherein the method comprises the steps of:

(a) receiving at said communication station a first message transmitted from one of the plurality of communication devices, wherein the first message is received as a corrupted message;

(b) following the receipt of the first corrupted message, receiving at the communication station a first plurality of messages, wherein the first plurality of messages are messages that are received as corrupted messages, and wherein at least one of the first plurality of corrupted messages is essentially identical to the first message;

(c) identifying at least one of the first plurality of corrupted messages that is essentially identical to the first corrupted message, and combining the first corrupted message with the at least one of the first plurality of corrupted messages that has been identified, to form a combined message; and (d) deriving from the combined message information which was transmitted within the first message.

The term "corrupted message" or "message received in a corrupted shape" as used herein and throughout the specification and claims, is used to denote a message that has preferably been transmitted in a proper shape but was received in a form that the receiving entity cannot operate (e.g. decode) thereon. Such a message may be a message which origin is unknown to the receiving entity at the time that the message is received and/or a message that its content cannot be properly retrieved by the receiving entity, for example where one or more bits out of the bits comprised therein are missing or deficient or are of a poor quality that would not allow the communication station to operate (e.g. decode) thereon. Such a corruption of a received message may be due to one or more reasons such as signal interference, reception problems caused by obstacles, long distance etc. A combination of the at least two corrupted messages is a combination of at least two essentially identical messages (e.g. the later being repetition of the earlier).

The term "communication station" as used herein and throughout the specification and claims, is used to denote a base station or a relay station.

The term "communication device" as used herein and throughout the specification and claims, is used to denote a user terminal, a mobile terminal, a fixed terminal and the like.

In accordance with another embodiment of the invention, the origin of the first message received in a corrupted shape and the origin of the first plurality of messages received in a corrupted shape are unknown to said communication station at the time of their receipt thereat.

According to another embodiment of the present invention, in the case where the processing of the combined message does not yield the expected information (e.g. does not result in obtaining meaningful information in addition to that already included in the first corrupted message, which could happen if for example the two messages are received from two different communication devices or the two messages are received from the same communication device do not carry the same data), the method provided further comprising a step of selecting at least one other message from among the first plurality of messages and repeating steps (c) and (d) using the newly selected other message for the formation of the combined message.

According to another embodiment of the invention the method further comprising a step of selecting at least one message out of said first plurality of messages that matches at least one pre-determined criterion, and carrying out steps (c) and (d) wherein the at least one of said first plurality of messages used to form the combined message is selected from among the at least one message that matches said at least one pre-determined criterion. Preferably, this step of selecting messages out of the first plurality of messages is a filtering step, whereby a second plurality of messages is identified from among the first plurality of messages and wherein the at least one criterion is used to increase the probability that a match would be found between the at least one other corrupted message and the corrupted message selected from among the second plurality of messages (rather from the first plurality which comprises all stored corrupted messages).

According to a related embodiment the at least one pre-determined selection criterion is a pre-defined period of time (or a range of time periods) that should lapse between two transmissions of the messages being used in forming the combined message or pre-defined minimal and/or maximal number of frames that would be received between two transmissions of the messages being used to form the combined message. Other pre-determined selection criteria could be for example CDMA ranging code type (initial or periodic), allocation size (in slots or bytes), or any other applicable more sophisticated criterion such as LLR.

According to another embodiment of the present invention the method may be implemented as part of any network entry or re-entry procedure, for example a first time entry, HO or link loss, prior to registering an MS with a BS that would become its serving BS. In HO the MS is located within an area serviced by a different BS and approaching to the area serviced by said BS. In this particular case the MS would start communicating (transmitting RNG-REQ) with the target BS as soon as it reaches the edge of the BS' cell coverage, hence reception problems are bound to happen. The method suggested by the present invention, allows increasing the success rate for identifying the MS through the information retrieved from the combined message, thereby making the HO process to be executed more smoothly and more rapidly.

According to yet another embodiment of the present invention prior to transmitting to the BS said first message that would be received in a corrupted shape, the MS was in idle mode. Hence, the BS has no knowledge on the identity of the MS and a complete NWE procedure is needed.

According to still another embodiment of the present invention the BS is further adapted to combine messages transmitted from at least one MS which has already become identifiable for the BS, and wherein that MS is not adapted to support HARQ over management procedure (i.e. management connections). In the NWE procedure, after the MS becomes identifiable, there are still some steps to be taken before the NWE procedure is completed. In case that corrupted messages are received during that stage, theoretically a HARQ operation can be executed as known in the art, but to do so it requires that the MS would support the HARQ procedure. The solution provided by the present invention allows overcoming this hurdle without being dependent on the MS whether it is capable of supporting the HARQ procedure or not.

According to another aspect of the present invention, there is provided a mobile subscriber terminal adapted to receive from its serving base station at least two corrupted messages and combine them into at least one message wherein the at least one combined message comprises meaningful information for the mobile subscriber terminal to operate on.

By still another aspect of the present invention there is provided a communication station adapted to receive a plurality of messages from a plurality of communication devices that communicate therewith, wherein a plurality of the messages received are in a corrupted shape and wherein the communication station is further adapted to combine at least two of the corrupted messages into at least one message, wherein the at least one combined message comprises meaningful information for the communication station to operate on.

BRIEF DESCRIPTION OF THE DRAWINGS

For a more complete understanding of the present invention, reference is made to the following detailed description taken in conjunction with the accompanying drawing wherein.

DETAILED DESCRIPTION OF THE INVENTION

A better understanding of the present invention is obtained when the following non-limiting detailed description is considered in conjunction with the following figures.

The present invention may be implemented in various cases where traditional HARQ procedure cannot be carried out as the identity of the MS is still unknown to the relevant BS, for example during the ranging phase of the NWE procedure, during network re-entry (on HO and link-loss) and in cases where the MS does not support HARQ operation over management connections, even though that the identity of the MS may be known to the BS. Let us consider an example of carrying out the NWE procedure while implementing the present invention. As was previously illustrated, the NWE procedure comprises two main steps (RNG and SBC) where the RNG step is executed before the MS is identifiable by the BS.

Figure 1:
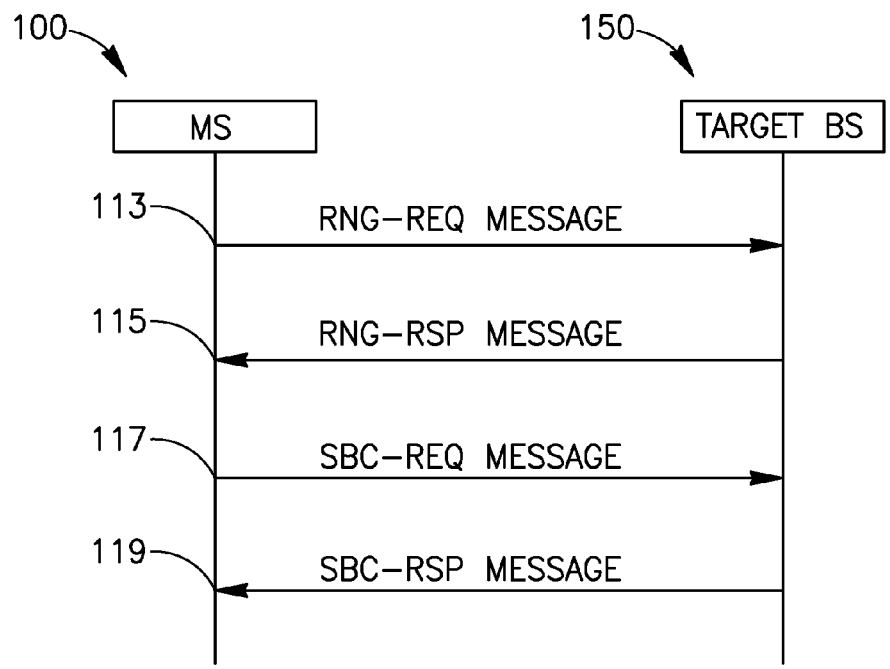
FIG. 1—demonstrates the NWE procedure as known in the art.
Figure 2:
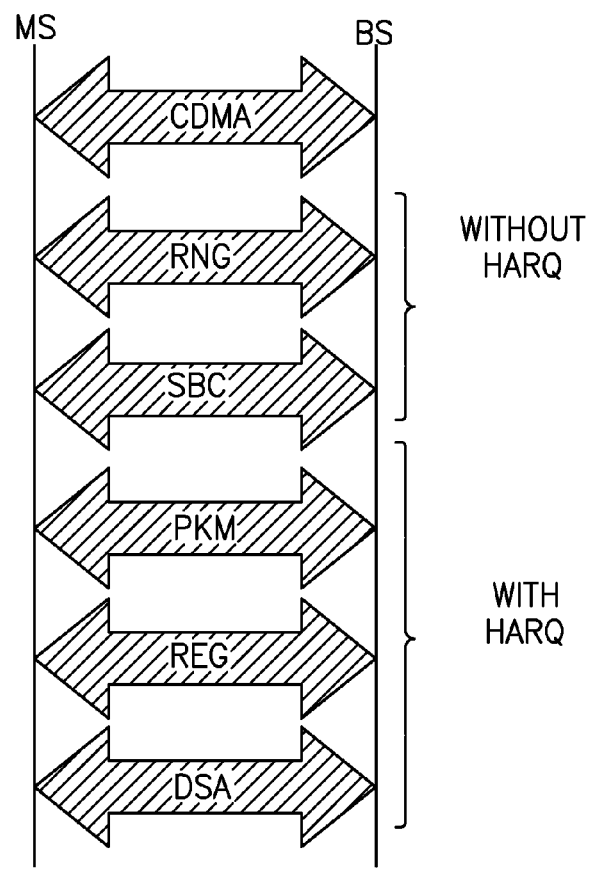
FIG. 2—presents the steps in the NWE procedure that use HARQ.
Figure 3:
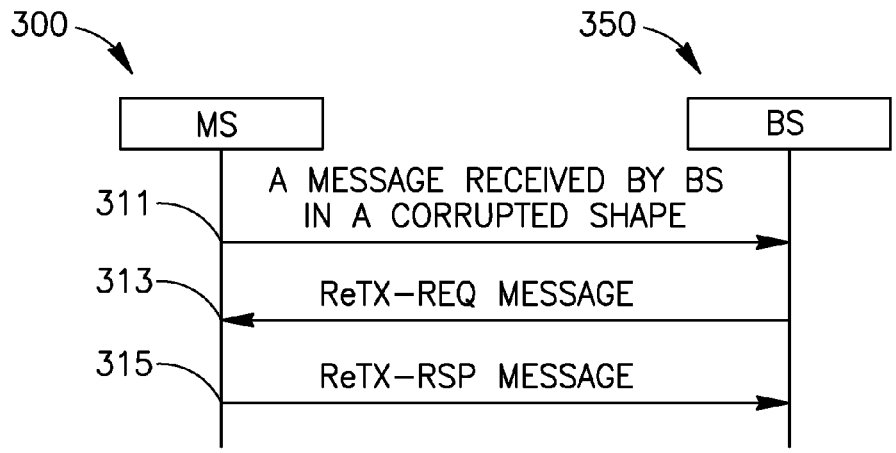
FIG. 3—illustrates HARQ operation in the uplink direction.
Figure 4:
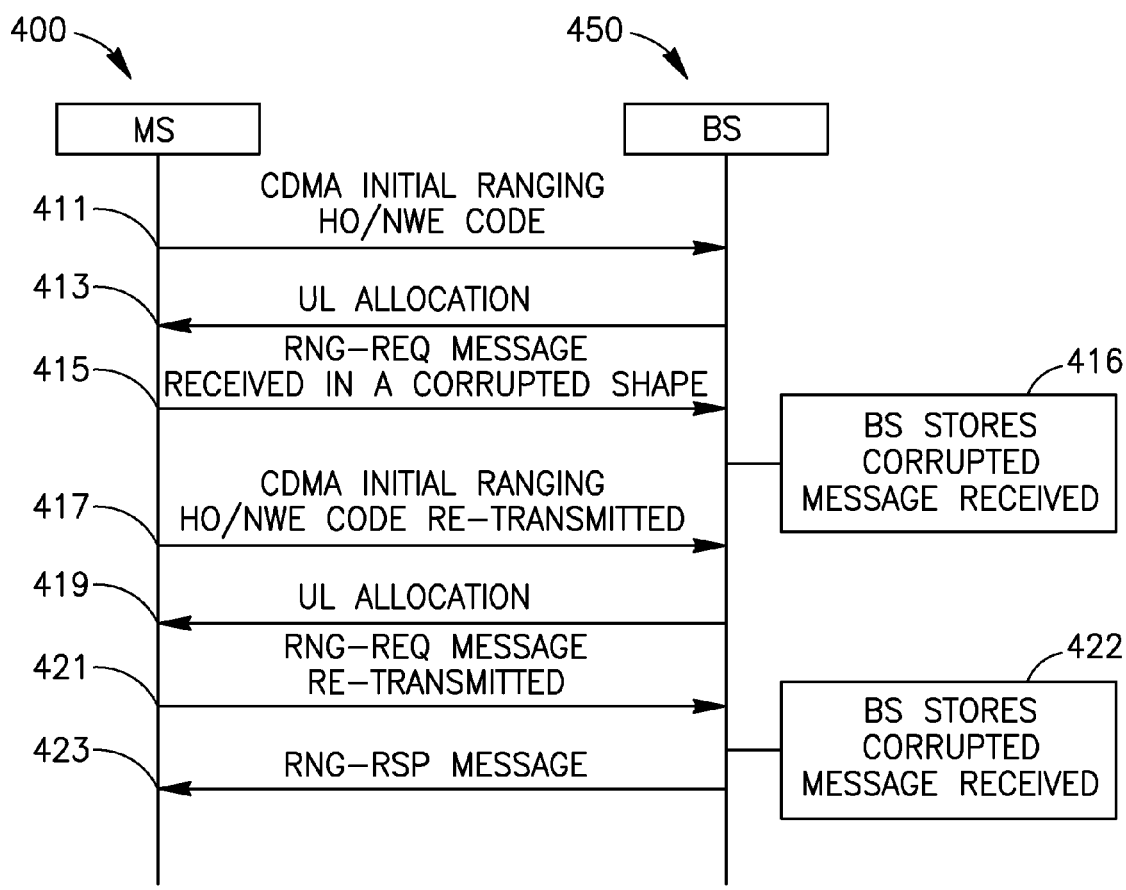
FIG. 4—illustrates the ranging procedure according to the present invention.

FIG. 4 describes the RNG transaction which is the first communication step carried out in the NWE procedure, for which no prior art HARQ procedures are carried out, and which is the subject of the present example. In the first step (411), a CDMA initial ranging NWE code (or HO code) is transmitted by MS 400 to BS 450. During this step the MS has still not been identified for the BS. Once BS 450 receives the CDMA initial ranging code it transmits (step 413) a UL allocation message towards MS 400. Upon receipt the UL allocation message, MS 400 transmits (step 415) a RNG-REQ, however according to this example, the RNG-REQ message of step 415 is received by the BS in a corrupted shape.

As the BS cannot operate (decode) on the corrupted message, it stores in a temporary storage (e.g. at the BS, within a network storage, etc.) memory and start collecting corrupted messages that are received thereat (step 416). After the expiring of a pre-determined period of time during which MS 450 has not received a RNG-RSP from the BS, it re-transmits the CDMA initial ranging code (step 417), and upon receiving the UL allocation message (step 419) it re-transmits the RNG-REQ (step 421). In this example, when the pre-defined period times out, a back off mechanism randomly selects a new transmission opportunity within a certain range of time (as indicated in the UCD by the BS).

Let us now assume that also the second RNG-REQ message is received in a corrupted shape (which is too often the case), and because the identity of MS 400 is still unknown, no HARQ operation can be used. Since the second RNG-REQ message received (step 421) is also corrupted it is stored (step 422) together with the already stored messages at the temporary storage means of the BS. Next, according to the embodiment of the present invention, an attempt is to be made to combine the messages (transmitted in steps 415 and 421) in order to receive a complete RNG-REQ. However, the problem is how to establish which of the messages stored according to step 416 may be combined with the message stored in step 422. One way of doing such a combination is by using a brute force approach by which one should try decoding each message of the plurality of stored messages and see which of them could be combined with the later message. However, this approach is, as can be appreciated, rather cumbersome approach. Thus, according to a preferred embodiment of the present invention one or more techniques are applied in order to minimize the number of messages that had been stored (the first plurality of messages, step 416) while ensuring that they still include the message that fits the one transmitted in step 422. If BS 450 has managed to successfully combine the two messages and recover from the combined message sufficient data, it would transmit a RNG-RSP (423) towards MS 400 in order to continue the NWE procedure of the present invention. However, in case where BS 450 has not succeeded in recovering sufficient data from the combined message, whether it is because no stored corrupted message was found to resemble the message received in step 421 or whether not enough data could be retrieved from the combination of the two corrupted messages (received in steps 415 and 421), then BS 450 would wait and continue collecting messages as MS 400 repeats the above process by sending in due time another RNG-REQ, which in turn can be used by BS 450 in trying to combine the three corrupted messages received in order to retrieve the required information. This process may be repeated, preferably on a random basis when MS 400 selects a new time opportunity to re-initiate the RNG process, until the required information may be retrieved, or the pre-defined period of time during which MS 400 may repeat its attempts to send these messages, would lapse.

As was previously mentioned, a more practical approach then trying to match the re-transmitted message with each of those stored among the first plurality of corrupted messages, is to apply one or more techniques to minimize the amount of messages that potentially can match the re-transmitted message. One such technique involves filtering of the non relevant messages. The MS is programmed to re-transmit certain messages, if after a pre-determined period of time it does not receive any notification that such a message has been received. Hence the two messages (the first message that has been stored among the plurality of corrupted messages and the second, the re-transmitted one) would be separated by at least a period of time $T_r$ or preferably the second retransmitted message, would be received within a period of time extending between $T_r-\delta T_1$ and $T_r+\delta T_2$ from the time that the first corrupted message was received (where $\delta T_1$ may be equal to $\delta T_2$). This can be used to set as a binding criterion regarding the minimum (and/or maximum) period of time that separates between the receipt of the corrupted messages from the same MS.

Another technique that may be used is to define a resemblance test between any two messages (two bursts), which may be carried out according to any method known in the art per se. For example, a similarity (resemblance) test may be achieved by correlating LLRs from two bursts. Let us denote the LLR vectors of two bursts by X and Y, then:

$$R=\Sigma(X[i]*Y[i])$$

wherein the higher R is, the better is the similarity that was achieved. Another method that can be adopted while implementing the present invention is, to reduce the computational resources required for the process by FEC decoding combinations that have already passed successfully a screening process of the stored corrupted messages. By clustering the incoming messages on the fly, any of the new arriving messages which fail to decode goes through a resemblance check with any other message in the database. Then picking the highest match providing that the threshold is passed, updating the message in the database by combining it with the newly arriving one, and decoding the updated message. If no match has occurred, adding the arriving message to the database. When decoding succeeds, any message that resembles the decoded one is discarded by applying the resemblance function where the LLR of each bit in the decoded messages is set to either positive high or negative high value. In addition, any message in the database that is composed of at least one "original" (non-combined) message that is too old, may also be discarded. This scheme requires only one additional decoding per any new incoming message. If higher complexity is permitted, better performance may be achieved. As an example, after each combining step, a resemblance test of the newly combined message is applied against all messages in the database. If the threshold is passed, then the best match is re-combined and this step is repeated if decoding fails. As will be appreciated by those skilled in the art, other schemes may be applied with further complexity. For example, one may consider combining a number of messages, e.g. 3 messages, which may improve the SNR obtained. Next, two such aggregated messages are combined, and if no CRC can be obtained based on the combined result, the matching process continues. It should be noted that in cases where the processing of the combined message does not result in meaningful information the BS may update the requirements as set for the resemblance test.

Figure 5:
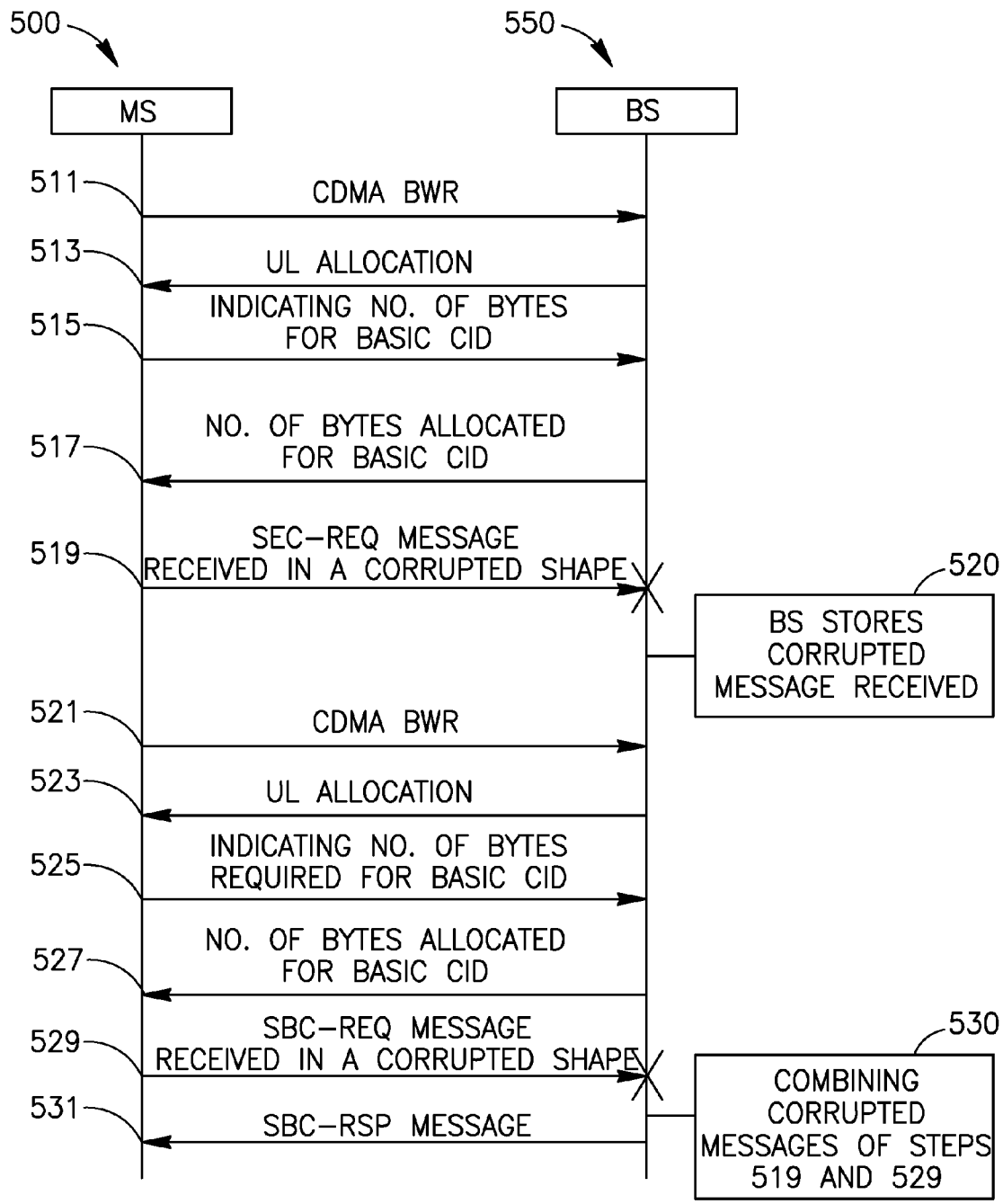
FIG. 5—illustrates the SBC procedure according to the present invention.

Another example for applying the method of the present invention is during the SBC transaction as illustrated in FIG. 5. In the NWE procedure according to this example, the SBC transaction step takes place upon completion of the ranging step. It usually begins with a CDMA BWR (bandwidth request) message (step 511) transmitted from MS 500 towards BS 550, even though there could be cases in which the BS provides the bandwidth allocation to the MS, before the latter made that request.

In reply to this message, the BS provides to the MS a 6 bytes UL allocation (step 513). Upon receiving the UL allocation, MS 500 transmits (step 515) an indication of how many bytes would be required in order to perform a transaction over the basic CID. In step 517, BS 550 transmits to the MS an indication which relates to the bandwidth allocated for the MS and its size, on the number of bytes allocated for the basic CID. After receiving the message in step 517, MS 500 transmits (step 519) a SBC-REQ which is a MAC message that includes information on the MCS level supportable by the MS. In our example, the BS receives the message of step 519 in a corrupted shape (due to various reasons such as those specified above) and even though it can associate it with a specific MS (because the UL allocation for the SBC-REQ was provided to the basic CID of the MS, which had been provided to the MS in the RNG-RSP message), it is not yet aware of the MS' capabilities which are provided through the SBC transaction, and consequently the standardized HARQ mechanism cannot be activated at that time.

Since the IEEE Recommendation allows the initiation of the HARQ procedure only after the completion of capabilities exchange which is done through the SBC transaction, the process of the present invention is invoked and therefore the base station stores the corrupted message in a temporary storage (step 520). If MS 500 does not receive from the BS a SBC-RSP message within a certain period of time, it is programmed to re-transmit the SBC-REQ, and steps 521 to 529 are essentially the repetition of steps 511 to 519. In the case described in this example, and assuming that the message transmitted in step 529 was also received in a corrupted shape, the BS combines (step 530) the messages transmitted in steps 519 and 529 and recovers therefrom all the information required for transmitting to the MS in step 531 the SBC-RSP. As discussed in connection with the example illustrated in FIG. 4, the method of the present invention should not be considered as being limited to combine only messages received from two transmissions, and furthermore it is adapted to perform combining step on the accumulated transmissions over the Basic CID (the SBC-REQ transmissions) of the MS having the new re-transmitted MAC address that had been provided by the MS in the RNG-REQ message, without having to inform the MS and without being required to establish handshake according to a pre-defined protocol.

Figure 6A:
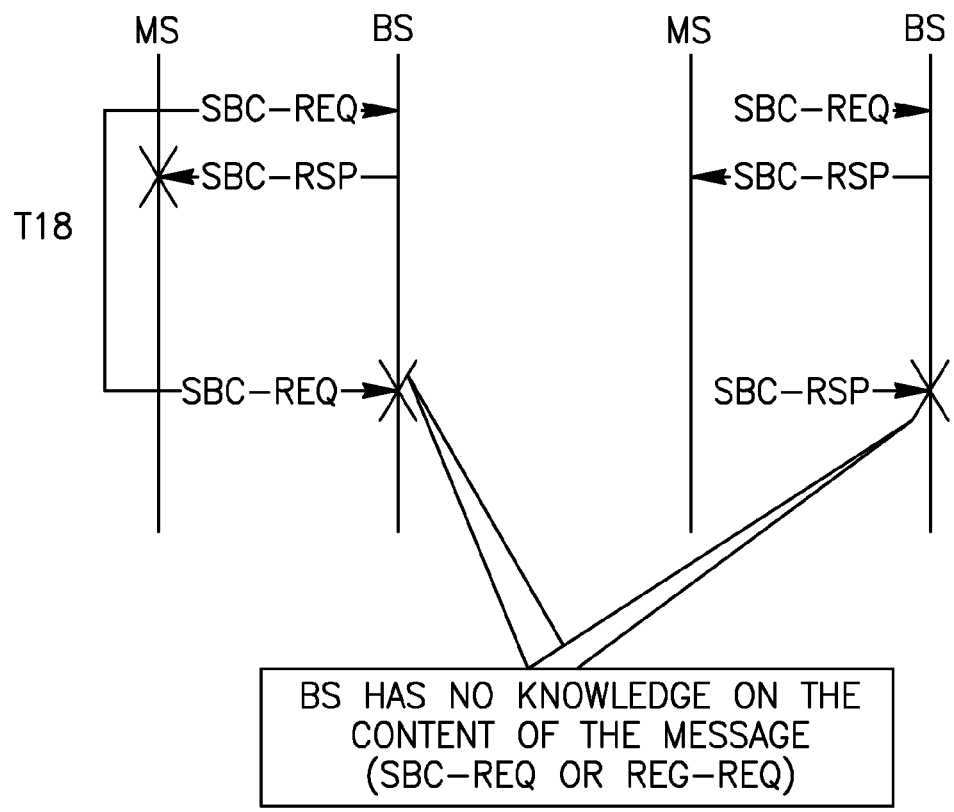
FIGS. 6A and 6B—illustrate further examples of cases in which the present invention is used.

As was previously explained, the method provided by the present invention is applicable not only in case that the origin of the corrupted messages is unknown, but also in cases where the origin is known, yet since the entity receiving the corrupted message is unaware of its content and therefore cannot be simply combined with the proceeding message received from the very same origin. FIG. 6A illustrates a scenario which takes place during NWE process, where the BS has no knowledge of the message it receives from the MS. Such a situation results from the fact that although the BS had previously received the SBC-REQ message properly, it is not aware (in certain cases) if the MS received properly the SBC-RSP that was sent by the BS. Consequently, the new message received by the BS in a corrupted shape might be a re-transmission of the SBC-REQ in which case the method of the present invention of combining messages with the correct message (if stored) will be of help, or it can simply be a new REG-REQ message.

Figure 6B:
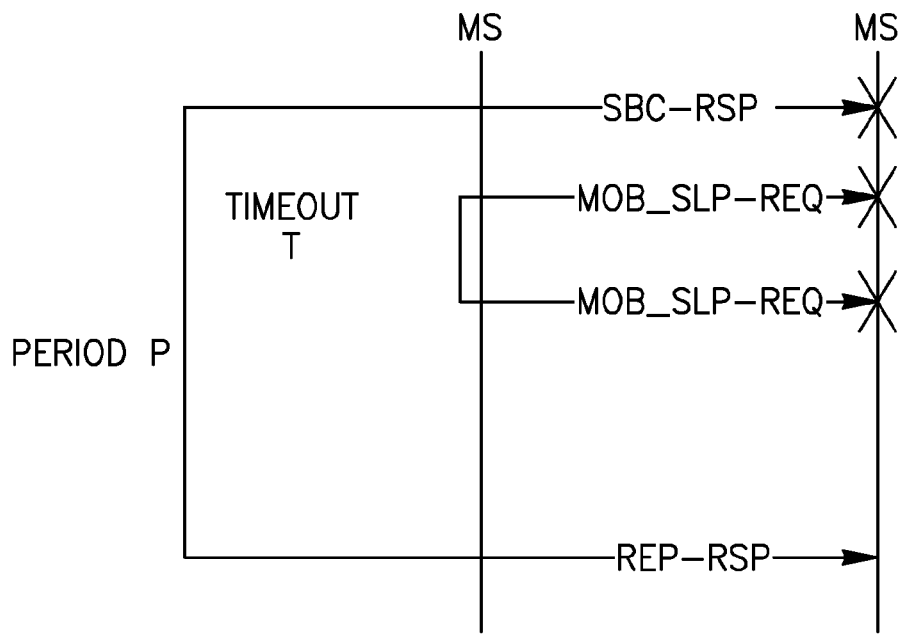

FIG. 6B illustrates another scenario which takes place after completing the NWE procedure (i.e. during normal operation) where the MS is not adapted to support HARQ over management connections. In such a case, the MS may initiate, or participate in several management transactions (different transactions) at the same time so that in order to retrieved meaningful information from the corrupted messages, the BS will be required to carry out the method provide by the present invention and to figure out while using a resemblance mechanism, which messages should be combined in order to retrieve that information. In this example, the MS transmits REP-REQ message (as part of the power-control mechanism) and MOB_SLP-REQ message as part of the sleep-mode mechanism. The REP-RSP messages are sent periodically over the Basic connection, and the MOB_SLP-RSP will be re-transmitted after a certain timeout during which no response from the BS is received over the Basic connection.

The feature that is mentioned above, i.e. the ability to perform message combining without the MS knowledge should not attributed only to SBC transaction. For many MSs which do not support HARQ, and all the transactions (for example in the NWE procedure RNG, SBC, PKM, REG and DSA) are executed without carrying out HARQ procedure, this impediment can easily be overcome while using the present solution as the BS is capable of combining received messages without the MS assistance.

As will be appreciated by those skilled in the art, the communications between the communication station (e.g. BS) and the MS in accordance with the present invention are exchanged in conformity with a standardized wireless protocol. Such a protocol may be for example an OFDMA protocol, a cellular protocol, a WiMax protocol, or an LTE protocol, and the like. Still it should be understood that other protocols may be used, all without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method of establishing wireless communication between a communication station and a plurality of communication devices during a network entry procedure, the method comprising:

receiving at said communication station a first message transmitted from an unidentified one of said plurality of communication devices that attempts to establish communication with the communication station and the one of said plurality of communication devices has not yet established communications with the communication station, therefore, the identity of said communication device from which said first message was received is unknown to said communication station at the time of receipt of said first message;

determining that said first message cannot be recovered correctly and storing said first message in a memory;

receiving at said communication station a plurality of additional messages that cannot be recovered correctly and storing said plurality of additional messages in said memory;

selecting a second message from said plurality of additional messages;

combining said first message with said second message to form a combined message;

deriving from said combined message information transmitted in said first message.

2. A method according to claim 1, further comprising selecting at least one other message from said plurality of additional messages for deriving the information transmitted within said first message.

3. A method according to claim 1, wherein said step of selecting comprises using at least one pre-determined selection criterion.

4. A method according to claim 3, wherein the at least one pre-determined selection criterion is a pre-defined minimum time interval between receiving said first message and receiving said second message.

5. A method according to claim 1, wherein said communication station is a base station (BS) and the one of said plurality of communication devices is a mobile station (MS).

6. A method according to claim 5, wherein said first message is a request for service from the mobile station.

7. A communication station in a wireless network, the communication station being adapted to receive a plurality of messages from a plurality of communication devices that communicate therewith, wherein a first plurality of the messages received are in a corrupted shape and wherein the communication station is further adapted to combine at least two of the first plurality of corrupted messages into at least one message, wherein the identity of communication devices from which said combined messages were received is unknown to said communication station at the time of receipt because the communication devices from which said combined messages were received has not yet identified itself to the communication station, wherein the at least one combined message comprises information which is not corrupted for said communication station to operate on.

8. A method according to claim 1, wherein said step of selecting comprises applying a resemblance test.

9. A method according to claim 8, wherein the resemblance test includes correlating log likelihood ratios.

10. A method according to claim 1, wherein said step of selecting comprises successively comparing messages from said plurality of additional messages with said first message until said second message is identified.

11. A method of establishing wireless communication between a base station and a plurality of subscriber terminals, the method comprising:
   receiving at the base station a first message from an unknown subscriber terminal which has not yet established communications with the communication station, therefore, and determining that the first message is a corrupted version of a transmitted message, which cannot be recovered correctly and the identity of the subscriber terminal is unknown to the base station at the time of receipt of the first message;
   storing the first message in a memory;
   receiving at the base station a plurality of additional messages that cannot be recovered correctly, and storing the additional messages in the memory, the messages having been sent from one or more subscriber terminals that have not yet identified themselves to the base station, therefore, the identity of the one or more subscriber terminals is unknown to the base station at the time of receipt of the additional messages;
   identifying a second message among the additional messages, and combining the second message with the first message to form a combined message; and
   obtaining a recovered message from the combined message, the recovered message being an error free version of the transmitted message.

12. A method of establishing communication over a wireless network that includes a base station and a plurality of subscriber terminals, the method comprising:
   receiving at the base station a corrupted version of a transmitted message, which cannot be recovered correctly, and storing the corrupted version in a memory, and the sender has not yet established communications with the communication station, therefore, the identity of the sender is unknown to the base station at the time of receipt of the transmitted message;
   receiving at the base station a plurality of additional messages that cannot be recovered correctly, and storing the additional messages in the memory, the plurality of additional messages having been sent from one or more subscriber terminals that have not yet identified themselves to the base station, therefore, the identity of the one or more subscriber terminals is unknown to the base station at the time of receipt of the additional messages;
   selecting a second message from the additional messages, and combining the second message with the corrupted version of a transmitted message to form a combined message; and
   obtaining a recovered message from the combined message, the recovered message being an error free version of the transmitted message.

13. A method according to claim 12, wherein selecting a second message from the additional messages comprises applying a resemblance test.

14. A method according to claim 13, wherein the resemblance test includes correlating log likelihood ratios.

15. A method according to claim 12, wherein the step of selecting a second message from the additional messages uses at least one predetermined selection criterion.

16. A method according to claim 15, wherein the at least one predetermined selection criterion uses a pre-defined minimum time interval between receiving the corrupted version of the transmitted message and the second message.

17. A method of operating a base station for establishing wireless communication with a plurality of subscriber terminals, the method comprising:
   receive a first message that is a corrupted version of a transmitted message which cannot be recovered correctly, and the sender of the first message has not yet identified itself to the base station, therefore, the identity of the sender is unknown to the base station at the time of receipt of the first message;
   subsequently receive a plurality of additional messages that cannot be recovered correctly, the plurality of additional messages having been sent from one or more senders that have not yet identified themselves to the base station, therefore, the identity of the one or more senders is unknown to the base station at the time of receipt of the additional messages;
   identify a second message from the additional messages; and
   combine the second message with the first message to form a combined message to obtain a recovered message which comprises information that is not corrupted.

18. A method according to claim 17, further comprising storing the first message and the additional messages in a memory.

* * * * *